(12) United States Patent
Kilani et al.

(10) Patent No.: US 8,264,494 B2
(45) Date of Patent: Sep. 11, 2012

(54) REMOTE GRAPHICS RENDERING ACROSS A NETWORK

(75) Inventors: Dali Kilani, Palo Alto, CA (US); Nils Bunger, Redwood City, CA (US); Aly E. Orady, Sunnyvale, CA (US); Frederick B. Fisher, Los Altos, CA (US); Jack C. Pien, Belmont, CA (US)

(73) Assignee: Pano Logic, Inc., Redwood City, CA (US)

(*) Notice: Subject to any disclaimer, the term of this patent is extended or adjusted under 35 U.S.C. 154(b) by 794 days.

(21) Appl. No.: 12/214,416

(22) Filed: Jun. 18, 2008

(65) Prior Publication Data
US 2008/0316218 A1 Dec. 25, 2008

Related U.S. Application Data

(60) Provisional application No. 60/936,134, filed on Jun. 18, 2007.

(51) Int. Cl.
*G06T 1/00* (2006.01)
(52) U.S. Cl. ...................... 345/522; 345/501

(58) Field of Classification Search .................. None
See application file for complete search history.

(56) References Cited

U.S. PATENT DOCUMENTS

| | | | |
|---|---|---|---|
| 5,864,342 A | 1/1999 | Kajiya et al. | |
| 6,044,408 A * | 3/2000 | Engstrom et al. | 719/328 |
| 6,101,445 A | 8/2000 | Alvarado et al. | |
| 6,411,302 B1 | 6/2002 | Chiraz | |
| 2003/0164831 A1 | 9/2003 | Walls et al. | |
| 2003/0164834 A1 | 9/2003 | Lefebvre et al. | |
| 2006/0010454 A1* | 1/2006 | Napoli et al. | 719/328 |
| 2006/0090006 A1* | 4/2006 | Wu | 709/238 |

* cited by examiner

*Primary Examiner* — Said Broome
*Assistant Examiner* — Janice Kau
(74) *Attorney, Agent, or Firm* — Van Pelt, Yi & James LLP

(57) ABSTRACT

A method for remotely displaying 3D information on a remote machine is disclosed. An application graphics command is generated, corresponding to a first 3D API from an application on a first machine. The application graphics command are translated to a remote graphics command corresponding to a second 3D API wherein the remote graphics command is compatible with a transport mechanism and a graphics driver on a second machine. The remote graphics command is transported over a network to a second machine.

30 Claims, 8 Drawing Sheets

Translation – No Transport Layer

REMOTE GRAPHICS RENDERING ACROSS A NETWORK

CROSS REFERENCE TO OTHER APPLICATIONS

This application claims priority to U.S. Provisional Patent Application No. 60/936,134 entitled REMOTE GRAPHICS RENDERING ACROSS A NETWORK filed Jun. 18, 2007 which is incorporated herein by reference for all purposes.

BACKGROUND OF THE INVENTION

Systems for remotely rendering three dimensional ("3D") graphics rely on platform-specific protocols and infrastructures, such as OpenGL over X11 for Linux/Unix based platforms and Remote Desktop Protocol version 6.0 ("RDP 6.0") for Microsoft Windows based platforms. These systems may present problems. Some software applications may only exist for a specific platform and are not available for users of different platforms. The Microsoft DirectX Graphics Application Programming Interfaces ("APIs") are only available for Microsoft Windows based platforms. Even when the same infrastructure is available, there may exist different versions, for example DirectX 9 and DirectX 7. RDP 6.0 is a closed protocol and implementing a client for all possible platforms is cost prohibitive and impractical.

OpenGL over X11 implementations on Microsoft Windows based platforms are not native and suffer from poorer performance. Similarly, translation to OpenGL using products like VMWare Workstation or Parallels Desktop to run Microsoft Windows applications on a platform not using Microsoft Windows, either by virtualization or emulation, suffers from poorer performance.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Allowing devices to work around limitations and remote any 3D graphics application to a 3D capable arbitrary device across a network is disclosed.

Figure 1:
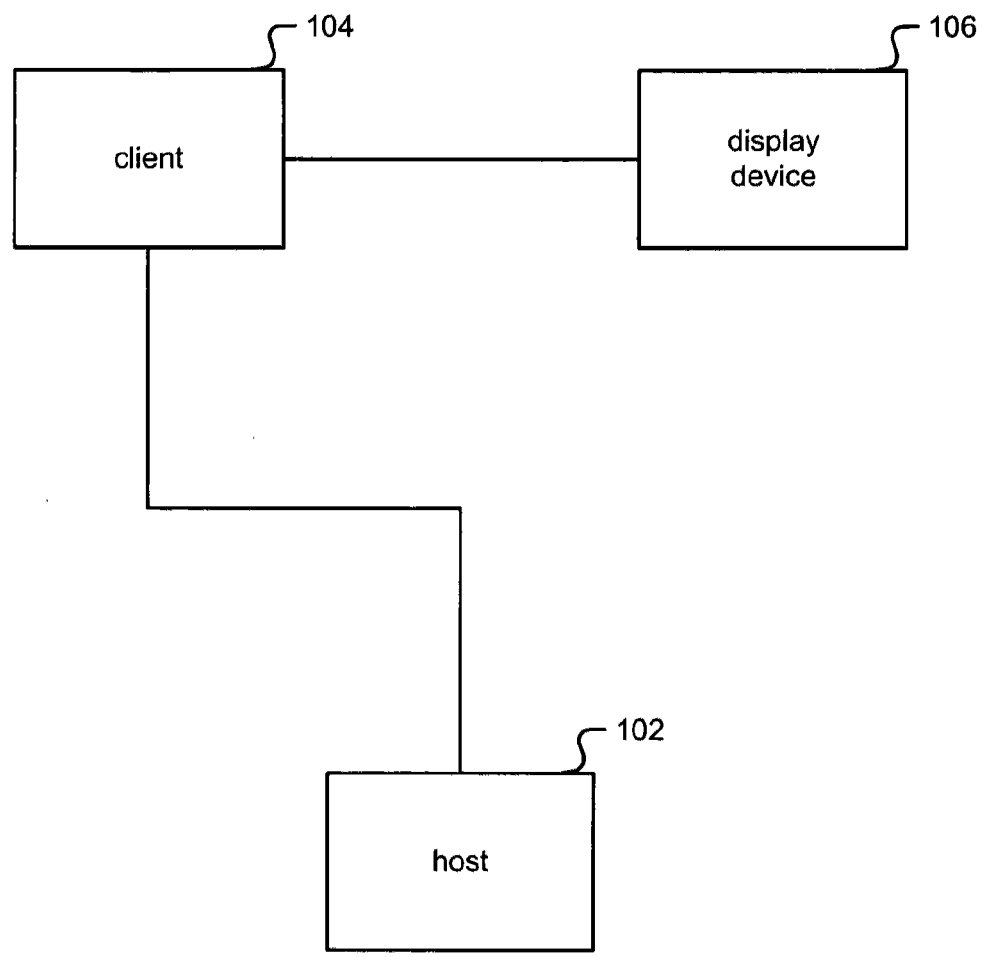
FIG. 1 is a block diagram illustrating an embodiment of a system for remote graphics rendering over a network.

FIG. 1 is a block diagram illustrating an embodiment of a system for remote graphics rendering over a network. In the example shown, host 102 is coupled to client 104. Client 104 communicates with display device 106. In some embodiments host 102 and client 104 are connected directly through a local bus connection. In some embodiments host 102 and client 104 are connected through a network. Throughout this specification, "network" refers to any public or private network and/or combination thereof. A network may include the Internet, an Ethernet, a serial/parallel bus, intranet, local area network ("LAN"), wide area network ("WAN"), or any form of connecting multiple systems and/or groups of systems together. In some embodiments host 102 and client 104 are connected through a network by using a thin network protocol ("TNP") over the Internet Protocol ("IP.")

In various embodiments client 104 may communicate to a renderer on the display device 106. In some embodiments, the renderer is an accelerator or coprocessor for:

two-dimensional graphics ("2D");
three-dimensional graphics ("3D"); or
physics or game-physics.

In some embodiments, the renderer is a software renderer or a hardware renderer. In some embodiments, the renderer is a computer processing unit ("CPU"), graphics processing unit ("GPU"), or a physics processing unit ("PPU"). Throughout this specification, "rendering" refers to any complex task performed to display on display device 106, including 2D acceleration, 3D acceleration, 4D acceleration, multi-dimensional acceleration, photorealistic rendering, and physics acceleration.

Throughout this specification, "3D" refers to any complex task performed to display on display device 106, including 2D acceleration, 3D acceleration, 4D acceleration, multi-dimensional acceleration, photorealistic rendering, and physics acceleration. Throughout this specification, "3D graphics" and "3D information" refers to graphics and information associated with any complex task performed to display on display device 106, including 2D acceleration, 3D acceleration, 4D acceleration, multi-dimensional acceleration photorealistic rendering, and physics acceleration. Throughout this specification, "3D application" refers to any application that may access a renderer for a complex task performed to display on display device 106, including 2D acceleration, 3D acceleration, 4D acceleration, multi-dimensional acceleration photorealistic rendering, and physics acceleration. Throughout this specification, "3D API" refers to any API to access a renderer for a complex task performed to display on display device 106, including 2D acceleration, 3D acceleration, 4D acceleration, multi-dimensional acceleration, photorealistic rendering, and physics acceleration.

Figure 2:
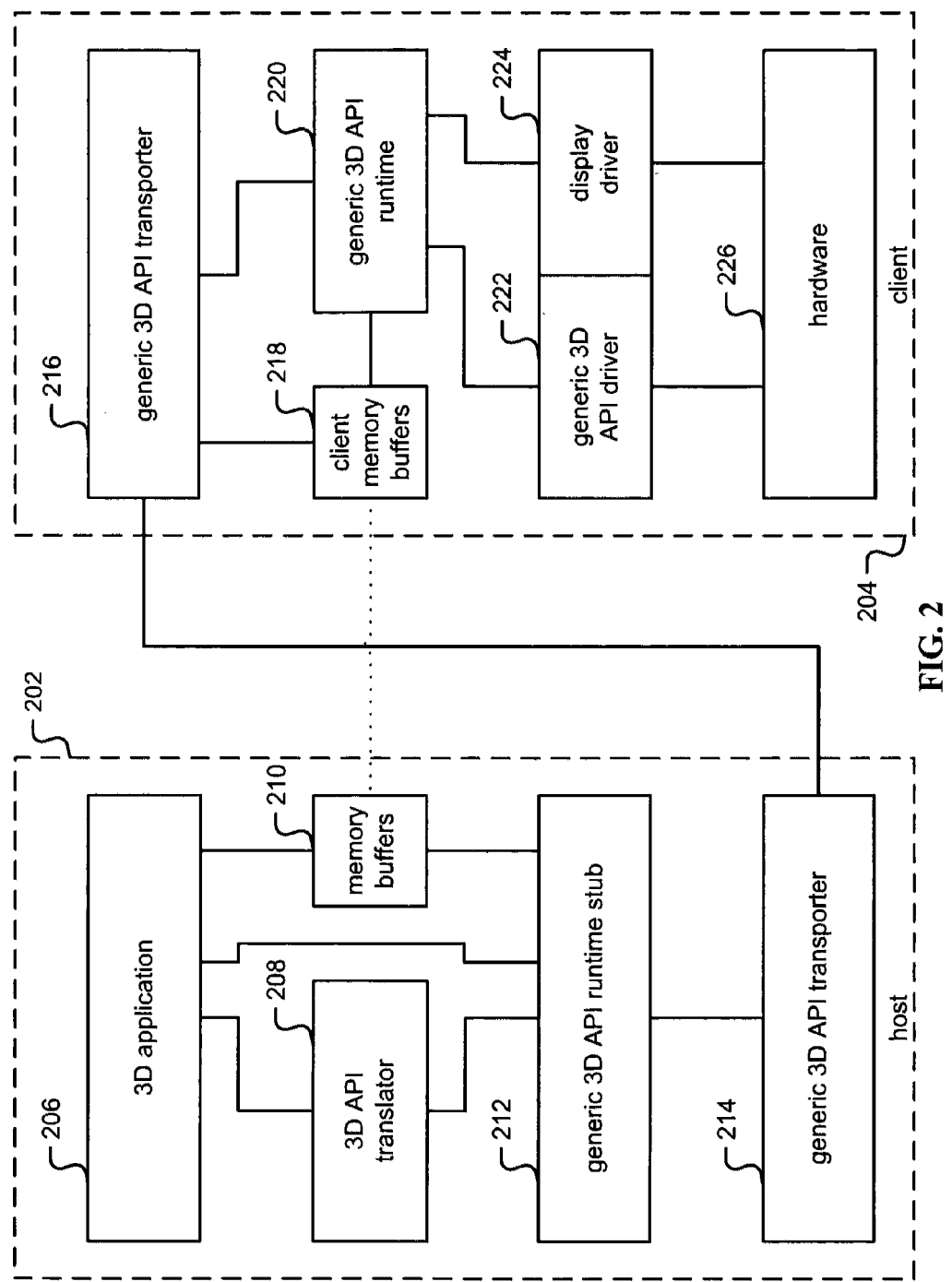
FIG. 2 is a block diagram illustrating an embodiment of a host and client for remote graphics rendering over a network.

FIG. 2 is a block diagram illustrating an embodiment of a host and client for remote graphics rendering over a network. The host 202 comprises one or more 3D applications and subsystems and client 204 comprises a renderer for 3D graphics. In some embodiments, one or more instances of one or more 3D applications run locally on a host 202 which may or may not have a renderer, for example 3D acceleration hardware such as a GPU, while the actual rendering is performed on one or more remote clients 204 which do have rendering capability.

Host 202 comprises a 3D application 206, which is coupled to both a 3D API translator 308 and memory buffers 210, which are both coupled to generic 3D API runtime stub 212. 3D application 206 may also be directly coupled with generic 3D API runtime stub 212. Generic 3D API runtime stub 212 is coupled to generic 3D API transporter 214 which is coupled to the corresponding client 204's generic 3D API transporter 216.

Client 204 comprises generic 3D API transporter 216, which is coupled to both client memory buffers 218 and generic 3D API runtime 220. Memory buffers 210 and client memory buffers 218 are logically coupled so that client memory buffers 218 represent a copy of memory buffers 210. Generic 3D API runtime 220 is coupled to both generic 3D API driver 222 and display driver 224, which are both coupled to client hardware 226.

The 3D application 206 running on host 202 invokes a local 3D graphics API. In some embodiments, the local 3D graphics API includes Microsoft DirectX or OpenGL. These calls are translated, as required, with 3D API translator 208, into cross-platform 3D API calls to stub 212 and use memory stored in buffers 210. When the local 3D graphics API is the cross-platform 3D API, the calls are directly made to stub 212. Throughout this specification, the term "cross-platform 3D API" is identical to the term "generic 3D API". In some embodiments, the generic 3D API is the OpenGL 3D API version 2.1 as specified by the OpenGL ARB. The resulting commands and data are transported using generic 3D API transporters 214 and 216. In some embodiments, the host and client are connected over a network. In some embodiments, the generic 3D API transporters 214 and 216 use a transport protocol such as UDP or TCP.

At client 204, the generic 3D API calls are transported to generic 3D API runtime 220 which connects/couples with the client memory buffers 218, additional processing may be performed. The calls also couple with the generic 3D API driver 222 and display driver 224, and the client hardware 226 is used. The client 204 may send some commands and data back to host 202 as a result of the received commands.

Connection Establishment.

In some embodiments, when the 3D application 206 is launched on host 202, it loads a binary that implements the runtime module for the 3D API used, usually in the form of a shared library. With 3D remote graphics rendering enabled, the 3D application 206 loads the local generic 3D API runtime stub 212 which invokes the 3D API transporters 214 and 216, also referred throughout this specification as the "3D API Transport Layer".

In the case where the 3D application 206 uses a 3D API that is different from the generic 3D API supported by the Transport Layer, 3D API translator 208 is used. 3D API translator 208 translates API calls and acts as the 3D application 206 from the point of view of generic 3D API runtime stub 212, and is also referred throughout this specification as the "3D API Translation Layer". The 3D API Transport Layer, when 3D API transporters 214 and 216 are coupled through a network, use network capabilities of the platform such as network sockets to connect.

Connection Teardown.

In some embodiments, when 3D application 206 terminates its operations and closes down, the local generic 3D API runtime stub 212 is unloaded. Upon notification of being unloaded it asks the generic 3D API transporter 214 to disconnect from the client 204. All the data buffers 210, 218 which have been allocated in the system are cleaned up. The client-side generic 3D API transporter 216 goes into listening mode waiting for incoming connections to service.

Figure 3:
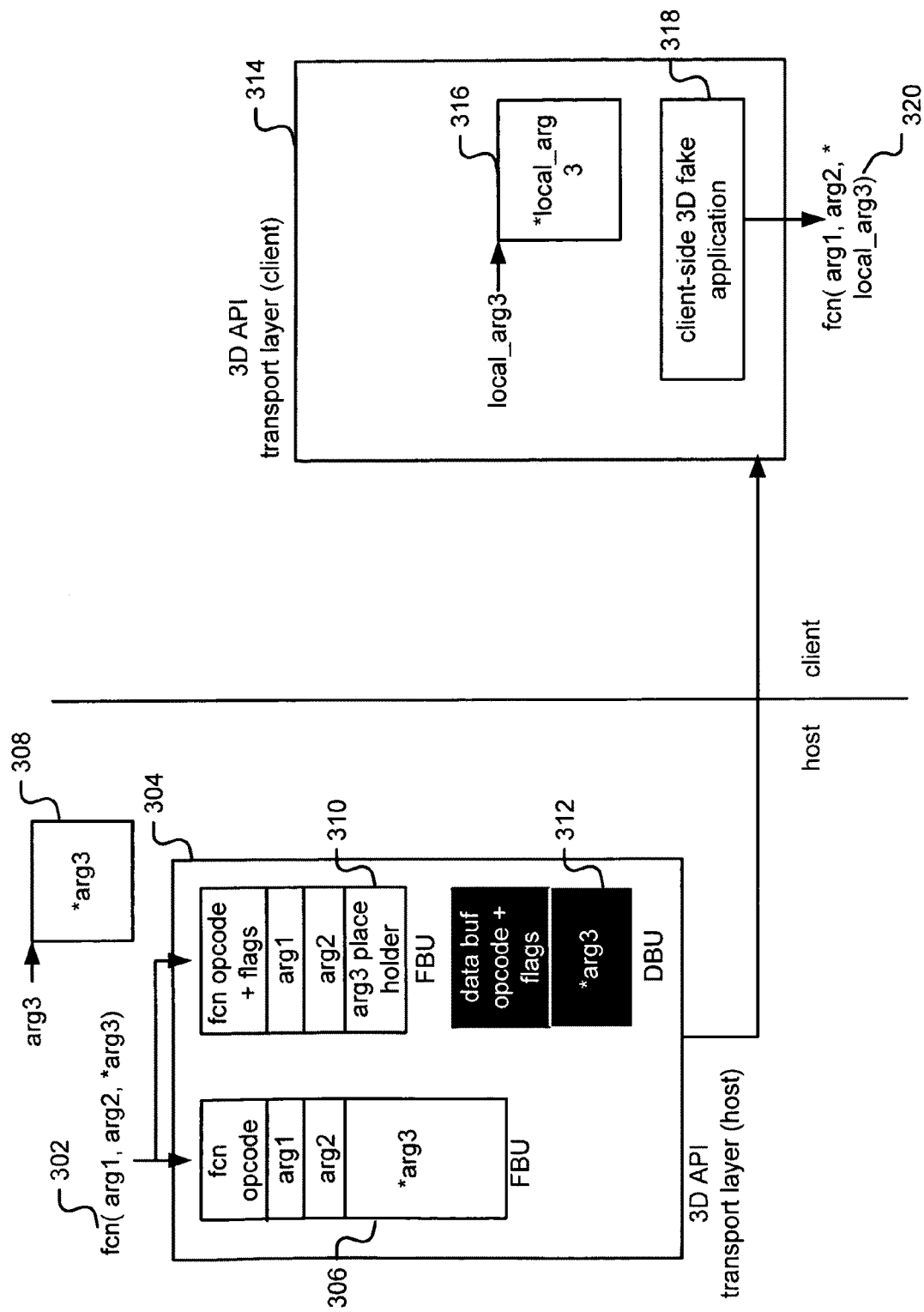
FIG. 3 is a block diagram illustrating an embodiment of 3D API encapsulation and transport.

FIG. 3 is a block diagram illustrating an embodiment of 3D API encapsulation and transport. The generic 3D API transporter 304 of FIG. 3 may be part of generic 3D API transporter 214 of FIG. 2. The buffer units 306, 310, 312 may be part of memory buffer 210. The generic 3D API transporter 314 of FIG. 3 may be part of generic 3D API transporter 216 of FIG. 2.

As 3D application 206 makes a 3D API call 302, the generic 3D API runtime stub 212 encodes each API call into a unique operation code ("opcode") and puts it at the top of the buffer to be transmitted. The API call arguments are added subsequently to the buffer. In some embodiments two buffer types may be used; a Function Buffer Unit ("FBU") for command encapsulation and a Data Buffer Unit ("DBU") for data encapsulation.

In some embodiments, where size permits, for the case where an argument of a 3D API call 302 is a pointer to an area of memory, the actual data located in that area of memory is added to the FBU 306. In the example shown in FBU 306, "arg 3" is a pointer 308 to an area of memory that fits in FBU 306.

In some embodiments, where size does not permit or where otherwise specified, for the case where an argument of a 3D API call 302 is a pointer to an area of memory, the other arguments are added to FBU 310, a "place holder" pointer is put in FBU 310 while the data itself is broken down into multiple pieces with opcode in DBU 312 and transmitted later on. In the example shown in FBU 310 and DBU 312, "arg 3" is a pointer 308 to an area of memory that is to be transmitted later on.

The FBU 306, or FBU 310 and DBU 312, are transported to generic 3D API transporter 314, where they are reassembled with pointers to memory 316 using client memory buffers 218 and fed to a client-side 3D fake application 318 that makes the transported 3D API call 320 to the generic 3D API Driver 222 and/or Display Driver 224.

In some embodiments, 3D APIs may be "statefull" implying that a 3D application binds various data buffers to various stages of the 3D rendering pipeline, for example textures for the texturing stage or depth buffers for the occlusion detection stage, before sending primitives through the processing stages.

EXAMPLE

The 3D API call 302 to explicitly instantiate a texture in OpenGL is glTexImage2D (void glTexImage2D(GLenum target, GLint level, GLint internalformat, GLsizei width, GLsizei height, GLint border, GLenum format, GLenum type, const GLvoid*pixels)).

This call takes a list of parameters along with a pointer to the actual texture data (*pixels) to create a texture object. When 3D application 206 calls glTexImage2D, the generic 3D API transporter 304 packs the opcode associated with glTexImage2D along with the list of arguments and their types. The argument which provides the pointer to the data 308 is marked for processing by the generic 3D API transporter 314. In this example, the data 308 is stored in the DBU 312 and other arguments in FBU 310, rather than only in FBU 306.

Upon reception of the FBU 310, the client-side 3D fake application 318 reconstructs the 3D API call which was encapsulated. As it detects that one of the arguments is a pointer to DBU 312, in this example the pixels argument, it allocates a client-side piece of memory, for example local_pixels using the information provided by the other arguments: width, height, format, border, etc. As DBUs are received at 3D API transporter 314, their content is stored in a pre-allocated memory area. After reception of the complete set of data including that in DBU 312, the client-side 3D fake application 318 makes the 3D API call 320 using all the arguments received from FBU 310 but replacing the value of pixels argument by local_pixels.

The same mechanism is used when the 3D API call 302 has multiple arguments which point to data buffers and therefore need to be transported using one or more DBUs.

Figure 4:
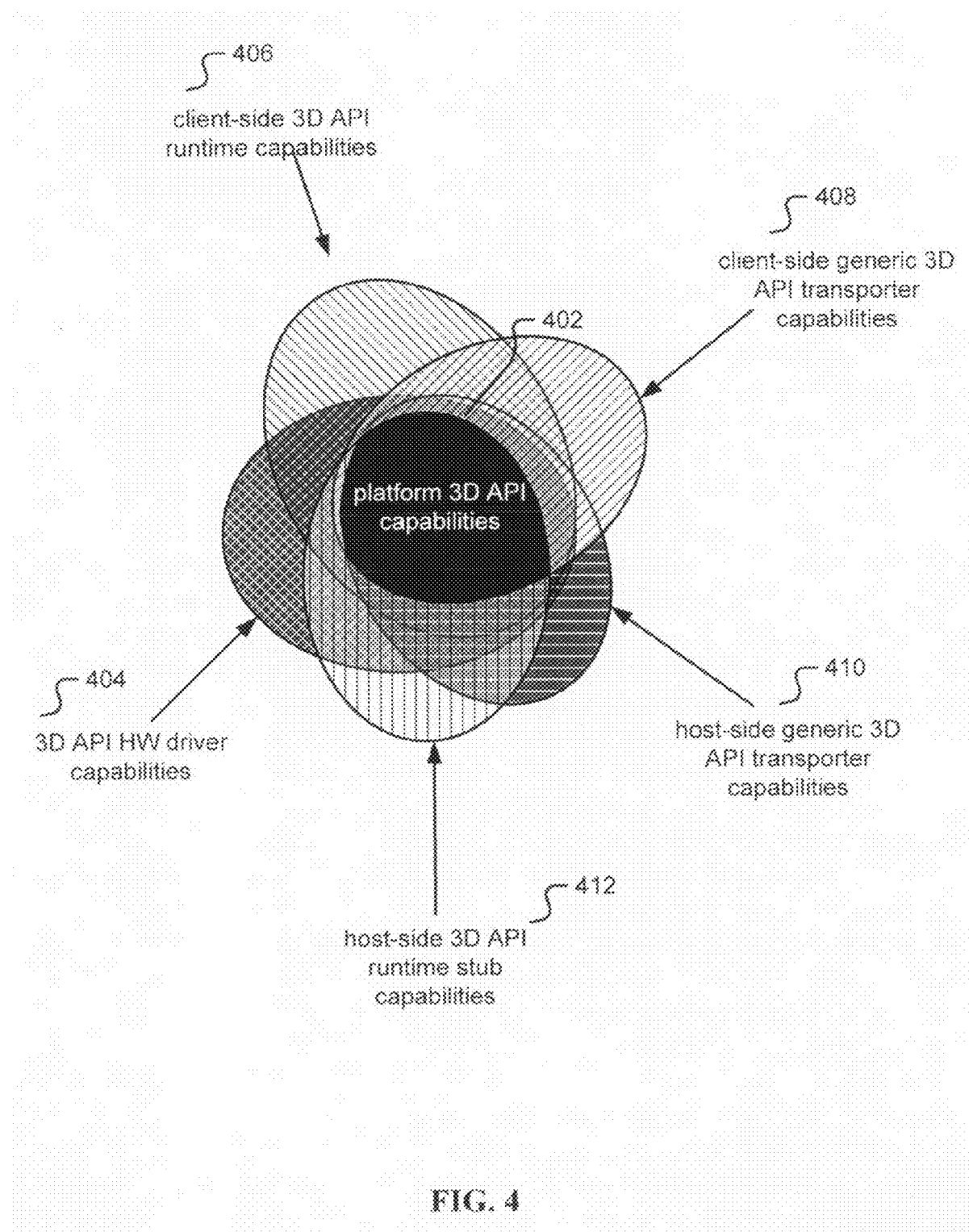
FIG. 4 is an illustration of the determination of capabilities reporting.

FIG. 4 is an illustration of the determination of capabilities reporting. Throughout this specification "capabilities" comprises:
 a. 3D API Version, for example OpenGL 1.0, OpenGL 1.4, OpenGL 2.0, OpenGL 2.1, DirectX 9, DirectX 9L, or DirectX10; and
 b. 3D API extensions, for example, Open GL Extensions: ARB_fragment_shader.

The logical path between the 3D application 206 to hardware 226 includes five components: generic 3D API runtime stub 212, generic 3D API transporter 214, generic 3D API transporter 216, generic 3D API runtime 220, and generic 3D API Driver 222. Each one of these five components has a set of capabilities that can differ depending on the version of the API supported as well as inherent limitations of the implementation.

The 3D application starts by requesting the system's capabilities by making a GetCapabilities query or equivalent. In some embodiments, each of the components makes sure it only reports capabilities that it can handle. The 3D API translator 208 will determine the platform's 3D API capabilities 402 as the common set between at least five capabilities:
 a. the client-side 3D API hardware driver capabilities 404;
 b. the client side 3D API runtime capabilities 406;
 c. the client-side generic 3D API transporter capabilities 408;
 d. the host-side generic 3D API transporter capabilities 410; and
 e. the host-side local 3D API runtime stub capabilities 412.

Figure 5A:
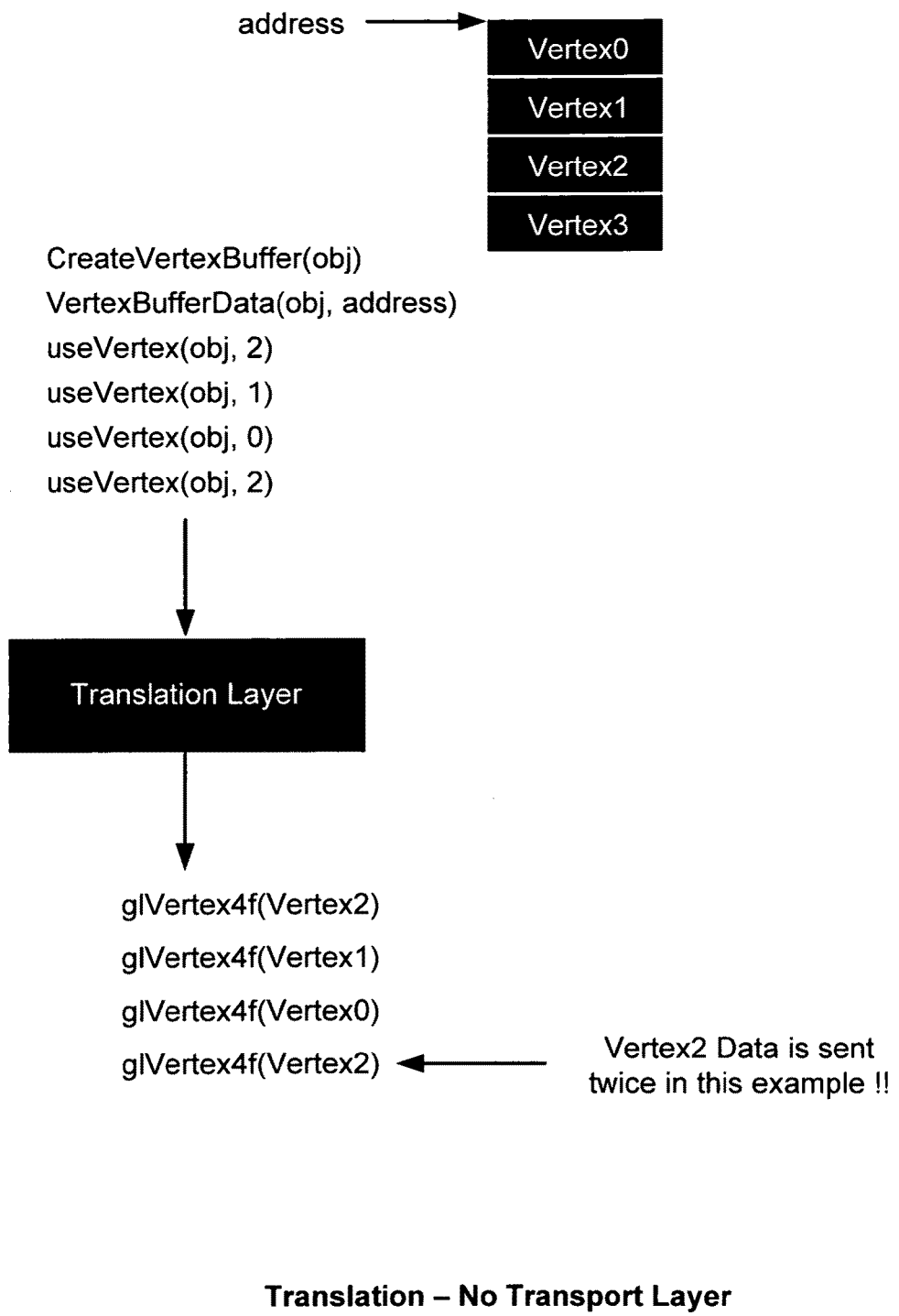
FIGS. 5A and 5B are a block diagram illustrating an embodiment of 3D API translation.
Figure 5B:
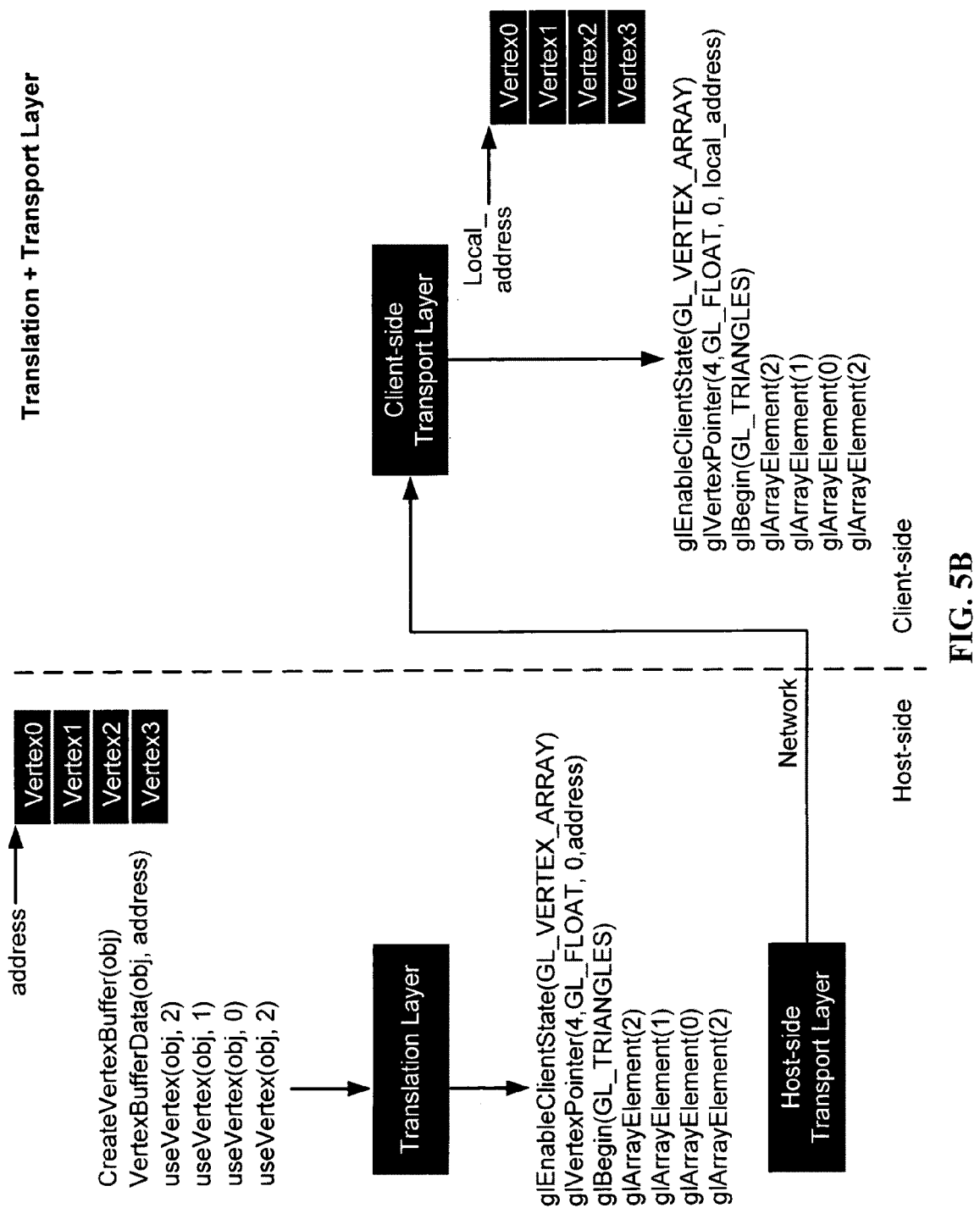

FIGS. 5A and 5B are a block diagram illustrating an embodiment of 3D API translation. The 3D API translation may be performed by 3D API translator 208 of FIG. 2.

When 3D application 206 uses a different 3D API than the generic 3D API supported by the generic 3D API Transport Layer 214/216, translation is performed. In some embodiments, when a 3D application 206 is written for the DirectX 3D API and executed, the 3D API Translation Layer 208 is a DirectX runtime which performs 3D API translation.

To perform such an operation, the 3D API Translation Layer 208 acts as an application that uses the generic 3D API supported by the generic 3D API Transport Layer 214/216. The 3D API Translation Layer 208 queries the capabilities of the platform, as described in FIG. 4, and constructs its own capabilities table that it reports back to 3D application 206.

In some embodiments, 3D APIs are similar in semantics and the translation between, for example, Microsoft DirectX API calls and OpenGL 3D API calls, is primarily a one to one operation when the API versions are close in functionality, for example DirectX 9 and OpenGL 2.x. When the API versions are not close in functionality, it may or may not be possible to map a given API call onto another one from the generic 3D API. In some embodiments, the Wine Open Source Project provides a set of libraries which is used as part of the 3D API Translation Layer 208 from the Microsoft DirectX 3D API to the OpenGL 3D API, for example DirectX API versions 7, 8, 9 and 9Ex to OpenGL version 2.1.

The translation of a 3D API call into a generic 3D API call takes into account that the 3D API Transport Layer 214/216 is used in conjunction with the 3D API Translation Layer 208. In some embodiments, 3D API Transport Layer 214/216 is more efficient at sending large segments of data at a time, whereby the 3D API Translation Layer 214/216 would use "transport friendly" generic 3D API calls/semantics.

An Example of Translation Decisions Affected by Transport Layer Presence.

A DirectX 3D application requests the use of Vertices to draw a 3D scene by using a "Flexible Vertex Format" buffer. The Translation layer has to translate the DirectX construct into an OpenGL one. There are three options:
 a. Use the OpenGL Immediate mode;
 b. Use the OpenGL Vertex Buffer Object mechanism; or
 c. Use the OpenGL Vertex Array mechanism.

Using the OpenGL Immediate mode as shown in FIG. 5A is a safe option for translating DirectX Vertex rendering options as OpenGL Immediate mode is present in all versions of the OpenGL API. The performance of such an implementation is adequate when the 3D API Translation Layer and the 3D rendering are performed on the same machine rather than a host and client as in FIG. 1. This is usually the case where the amount of geometry primitives used by 3D application 206 is small.

However, given that the 3D API Transport Layer 214/216 is inefficient at packaging small buffers, if the Vertex Array or Vertex Buffer Object mechanisms are supported by the 3D Platform as described in FIG. 4, the 3D API Translation Layer 208 can use either of them for better system performance despite the extra overhead that using Vertex buffers introduces such as management or initialization. That is, 3D API Translator 208 translates the application graphics command based at least in part on the resulting data unit size required for its transport over a network. As shown in FIG. 5B, an extra benefit of using these mechanisms is that Vertex data is only sent once across the network. It can be referenced on the client-side multiple times without having to send the Vertex data again.

In some embodiments, the 3D API Translation Layer may "compile" a complex geometry and/or commands into primitive geometries and/or commands if the platform 3D API capabilities 402 do not comprise APIs for the complex geometry and/or commands. For example, for a platform 3D API that does not support the capabilities for quadrants, the 3D API Translation Layer may compile the quadrants to vertices and edges which are supported by the platform 3D API.

Figure 6:
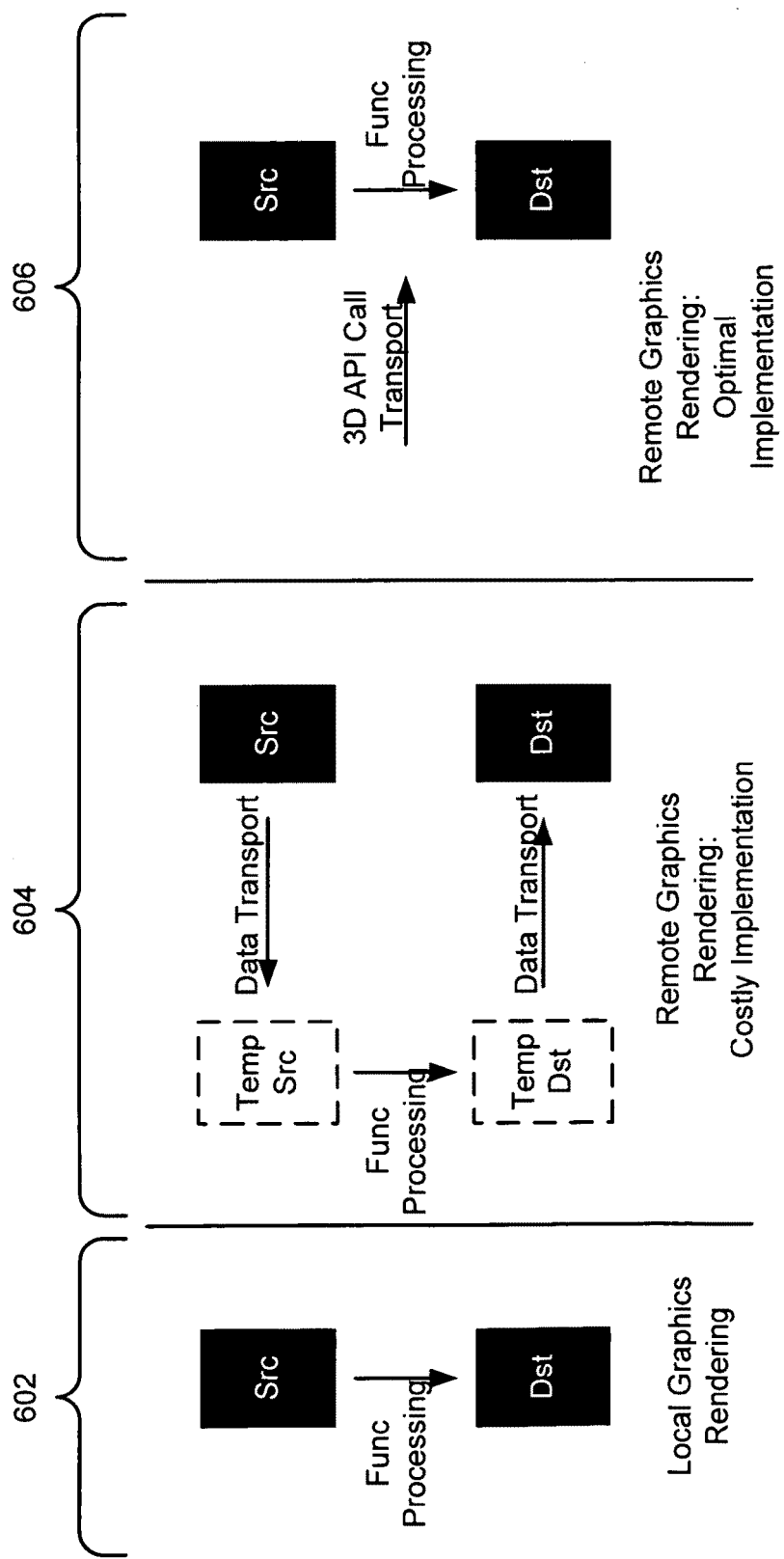
FIG. 6 is a block diagram illustrating an embodiment of data buffer caching.

FIG. 6 is a block diagram illustrating an embodiment of data buffer caching. 3D APIs specify various calls 602 which copy/transform data from a source buffer to a destination. Examples include glTexImage2D for OpenGL and UpdateSurface for DirectX.

In the context of remote graphics rendering, the source buffer is usually located on the client side 204 since it has been previously transported across the network or rendered on the client side 204. In such a case, a trivial but low-performing implementation 604 of these API calls would be to:

a. Copy source buffer 218 from client 204 to the buffer 210 at host 202;
b. Perform the operation locally at host 202; and
c. Send the destination buffer 210 from host 202 to the buffer 218 at client 204.

Such an implementation has two drawbacks:
a. It uses excessive network bandwidth for sending the data back and forth; and
b. It reduces the use of acceleration for the copy/transform operation since the host 202 may not have any renderer or hardware 226 available.

In some embodiments, a more optimal implementation 606 is used and follows the steps described below:

a. Transport the function call, as described in FIG. 3 and above, to the client 204; and
b. Use the cached copy of the source buffer 218 on the client side to perform the operation.

In some embodiments, to use implementation 606 the host 202 and client 204 track changes to memory so that they are accurately reflected in source buffer 218.

Data Compression.

The bandwidth used by the data buffer transfers described can be reduced by using compression techniques such as lossy or lossless image compression algorithms for Texture data surfaces, for example JPEG or Run Length Encoding. For other buffers, lossless compression such as Lempel-Ziv, Zip or gzip compression may be used. The header present in each DBU contains flags which indicate whether compression is enabled or not in the present DBU and the type of compression used.

Figure 7:
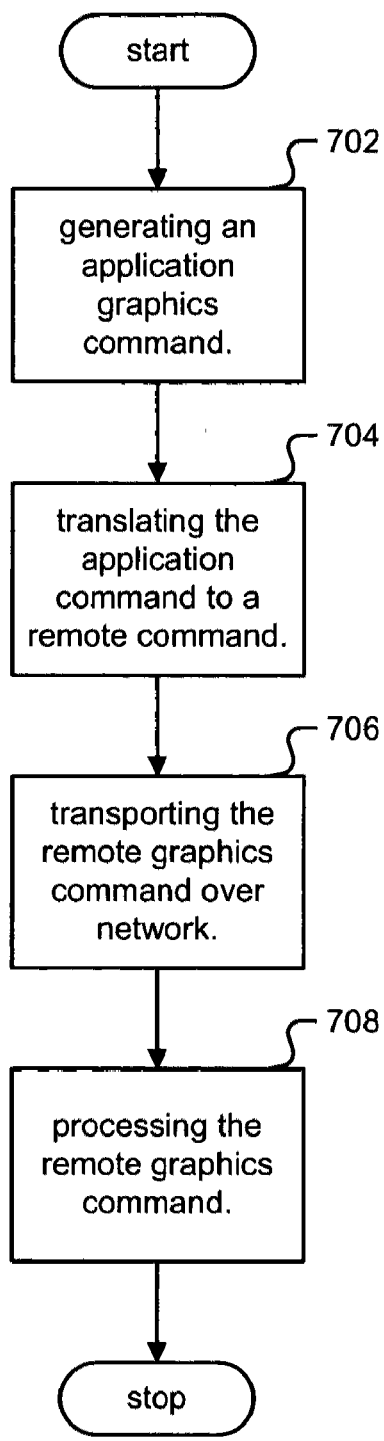
FIG. 7 is a flowchart illustrating an embodiment of a process for remote graphics rendering over a network.

FIG. 7 is a flowchart illustrating an embodiment of a process for remote graphics rendering over a network. In step 702, an application graphics command is generated, for example in 3D application 206. In step 704, the application graphics command is translated to a remote command in a generic 3D API, for example with 3D API translator 208. In step 706, the remote graphics command is transported over the network, for example with generic 3D API transporter 214 to 216. In some embodiments, in step 708, the remote graphics command may be processed, for example rendered on the client using generic 3D API runtime 220 and/or hardware 226.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A host system for remotely displaying 3D information on a client, comprising:
a processor configured to:
request capabilities of a client 3D API hardware driver;
request capabilities of a generic 3D API transporter;
request capabilities of a host 3D API runtime stub; and
determine a cross-platform 3D API based at least in part on a common set of the requested capabilities;
a memory buffer used for host 3D API calls;
a translator configured to:
generate an application graphics command corresponding to a host 3D API from an application on the host;
translate the application graphics command to a remote graphics command corresponding to a cross-platform 3D API; and
a transporter configured to:
transport the remote graphics command over a network to the remote client.

2. The host recited in claim 1, wherein the transporter is further configured to use a place holder.

3. The host recited in claim 1, wherein the translator is further configured to compile to more primitive commands.

4. The host recited in claim 1, wherein the translator is further configured to compile to more primitive geometries.

5. The host recited in claim 1, wherein the translator is further configured to report a list of capabilities to the application.

6. The host recited in claim 1, wherein the translator is further configured to report a list of capabilities to the application and to translate the application graphics command based at least in part on the list of capabilities.

7. The host recited in claim 1, wherein the translator translates the application graphics command based at least in part on the resulting data unit size required for its transport over a network.

8. The host recited in claim 1, wherein the transporter is further configured to transport using data compression.

9. The host recited in claim 1, wherein the transporter is further configured to transport using data buffer caching.

10. The host recited in claim 1, wherein the transporter is further configured to transport using data buffer caching by tracking changed memory.

11. The host recited in claim 1, wherein the transporter is further configured to transport using data buffer caching by tracking at the host that the client has a client buffer to be modified and sending instructions to the client to modify the client buffer that the client already has instead of sending a revised buffer modified at the host.

12. A client system for displaying 3D information from a remote host, comprising:
a client memory buffer used for client 3D API calls, wherein the client memory buffer is logically coupled to a memory buffer on the remote host;
a transporter configured to:
transport a graphics command corresponding to a cross-platform 3D API over a network from the remote host, wherein:
capabilities of a client 3D API hardware driver are requested;
capabilities of a generic 3D API transporter are requested;
capabilities of a host 3D API runtime stub are requested; and
the cross-platform 3D API is determined based at least in part on a common set of the requested capabilities; and
the graphics command is translated from a generated application graphics command corresponding to a host 3D API from an application on the host.

13. The client recited in claim 12, further comprising a renderer configured to render the graphics command on the client.

14. The client recited in claim 12, further comprising a renderer configured to render the graphics command on the client by referencing a place holder.

15. The client recited in claim 12, wherein the transporter is further configured to transport using data compression.

16. The client recited in claim 12, wherein the transporter is further configured to transport using data compression by data buffer caching.

17. The client recited in claim 12, wherein the transporter is further configured to transport using data buffer caching by tracking changed memory.

18. A method for remotely displaying 3D information on a remote machine, comprising:
- requesting capabilities of a client 3D API hardware driver;
- requesting capabilities of a generic 3D API transporter;
- requesting capabilities of a host 3D API runtime stub;
- determining a cross-platform 3D API based at least in part on a common set of the requested capabilities;
- generating an application graphics command corresponding to a first 3D API from an application on a first machine;
- translating the application graphics command to a remote graphics command corresponding to the cross-platform 3D API; and
- transporting the remote graphics command over a network to a second machine.

19. The method recited in claim 18, further comprising rendering the remote graphics command on the second machine.

20. The method recited in claim 18, further comprising rendering the remote graphics command on the second machine including referencing a place holder.

21. The method recited in claim 18, wherein generating includes reporting a list of capabilities to the application.

22. The method recited in claim 18, wherein generating includes reporting a list of capabilities to the application and translating is based at least in part on the list of capabilities of the cross-platform 3D API.

23. The method recited in claim 18, wherein translating includes compiling to more primitive commands.

24. The method recited in claim 18, wherein translating is based at least in part on the resulting data unit size required for its transport over a network.

25. The method recited in claim 18, wherein translating includes compiling to more primitive geometries.

26. The method recited in claim 18, wherein transporting includes using a place holder.

27. The method recited in claim 18, wherein transporting includes using data compression.

28. The method recited in claim 18, wherein transporting includes using data buffer caching.

29. The method recited in claim 18, wherein transporting includes using data buffer caching by tracking changed memory.

30. The method recited in claim 18, wherein transporting includes using data buffer caching by tracking at the first machine that the second machine has a first data to be modified and sending instructions to the second machine to modify the first data that the second machine already has instead of sending a second data modified at the first machine.

* * * * *